United States Patent [19]

Mouilhayrat et al.

[11] Patent Number: 4,508,297

[45] Date of Patent: Apr. 2, 1985

[54] SATELLITE ON AN EQUATORIAL ORBIT WITH IMPROVED SOLAR MEANS

[75] Inventors: Guy G. Mouilhayrat, Ramonville; Paul A. J. Duchon, Venerque; Jean M. A. M. Guilbert, Montgiscard; André A. Rolfo, Castanet, all of France

[73] Assignee: Centre National d'Etudes Spatiales, Paris, France

[21] Appl. No.: 469,317

[22] Filed: Feb. 24, 1983

[30] Foreign Application Priority Data

Mar. 2, 1982 [FR] France .................................. 82 03412

[51] Int. Cl.³ .............................................. B64G 1/44
[52] U.S. Cl. ................................... 244/173; 244/165; 244/171
[58] Field of Search .................. 244/158 R, 159, 169, 244/173, 168, 171, 165

[56] References Cited

U.S. PATENT DOCUMENTS

| | | | |
|---|---|---|---|
| 3,258,224 | 6/1966 | Sohn | 244/168 |
| 3,358,944 | 12/1967 | Ule | 244/168 |
| 3,439,884 | 4/1969 | Slater | 244/171 |
| 4,193,570 | 3/1980 | Hoffman et al. | 244/165 |
| 4,230,294 | 10/1980 | Pistiner | 244/171 |
| 4,262,867 | 4/1981 | Piening | 244/173 |
| 4,374,579 | 2/1983 | Renner et al. | 244/171 |
| 4,375,878 | 3/1983 | Harvey et al. | 244/165 |

*Primary Examiner*—Galen L. Barefoot

[57] ABSTRACT

Equatorial orbit satellite with solar panels having blades with a medium line inclined at a certain angle relative to the equatorial plane. Thus, the field of vision of the antennaes is freed and disturbing torques become acceptable.

2 Claims, 7 Drawing Figures

SATELLITE ON AN EQUATORIAL ORBIT WITH IMPROVED SOLAR MEANS

BACKGROUND OF THE INVENTION

The present invention relates to a satellite on an equatorial orbit with improved solar means and which is more particularly used in satellite telecommunications.

The satellite according to the invention is of the "stabilized three axes" type. In such a satellite, the payload is placed on a main body rotating about an axis perpendicular to the plane of the orbit, i.e. in parallel to the North-South axis. The rotation speed is such that one of the faces of the satellite is constantly oriented towards the earth. The solar generator comprises two flat blades or fins covered with solar collectors.

A satellite of the present type and which is closest to that according to the invention is described in French Pat. No. 2 472 509 (corresponding to U.S. Pat. No. 4,374,579). It is illustrated in FIG. 1 and comprises:
- a service module 21 equipped with a polar stellar sensor 25 positioned on the north face 211, a solar sensor 26 located on the solar face 212, whereby said sensors are arranged in such a way as to supply attitude control information along three axes for the stabilization of the satellite;
- solar panels 23 rigidly fixed to the service module in such a way that when they are opened out in orbital configuration, they extend in the orbital plane;
- a rotary interface device 24 fixed to the service module;
- a payload module 22 equipped with antennas and connected to the interface device, the latter being arranged in such a way as to permit the payload module 22 to be continuously pointed towards the earth.

Such a configuration has disadvantages with respect to the solar means used by it. Throughout the remainder of the description, "solar means" are understood to mean means having a function relating to the sun.

BRIEF SUMMARY OF THE INVENTION

The present invention relates to a satellite in which the solar means are arranged in such a way as to prevent these disadvantages, either through making better use of the sun, or to avoid its harmful effects providing a better protection.

The first arrangement used by the invention involves the orientation of the solar panels. In the prior art as illustrated in FIG. 1, these panels are in the orbital plane. This is prejudicial to the antennas mounted on the payload, particularly in the case of large fields of vision (10° to 20° or more).

According to a first feature of the invention, the solar panels are inclined to the orbital plane, which frees the ends thereof. The slope is either preset on the ground, or can be modified during flight.

According to a second feature, the satellite has a sun shield fixed to the platform and which protects the payload from solar radiation.

According to a third feature, actuation means comprising a kinetic wheel and a reaction wheel permit control both during non-eclipse periods and during solar eclipse periods under economic conditions.

According to a fourth feature, the polar stellar sensor is placed on the antisolar face of the platform and not on the North face, which protects it from solar radiation.

Finally, according to a last feature, a web or solar web system can be fixed to the payload to reduce external and in particular solar disturbing torques.

BRIEF DESCRIPTION OF THE DRAWINGS

The invention is described in greater detail hereinafter relative to non-limitative embodiments and with reference to the attached drawings, FIG. 1 having already been described, wherein show.

DETAILED DESCRIPTION OF THE PREFERRED EMBODIMENTS

Figures 1, 2, 3:
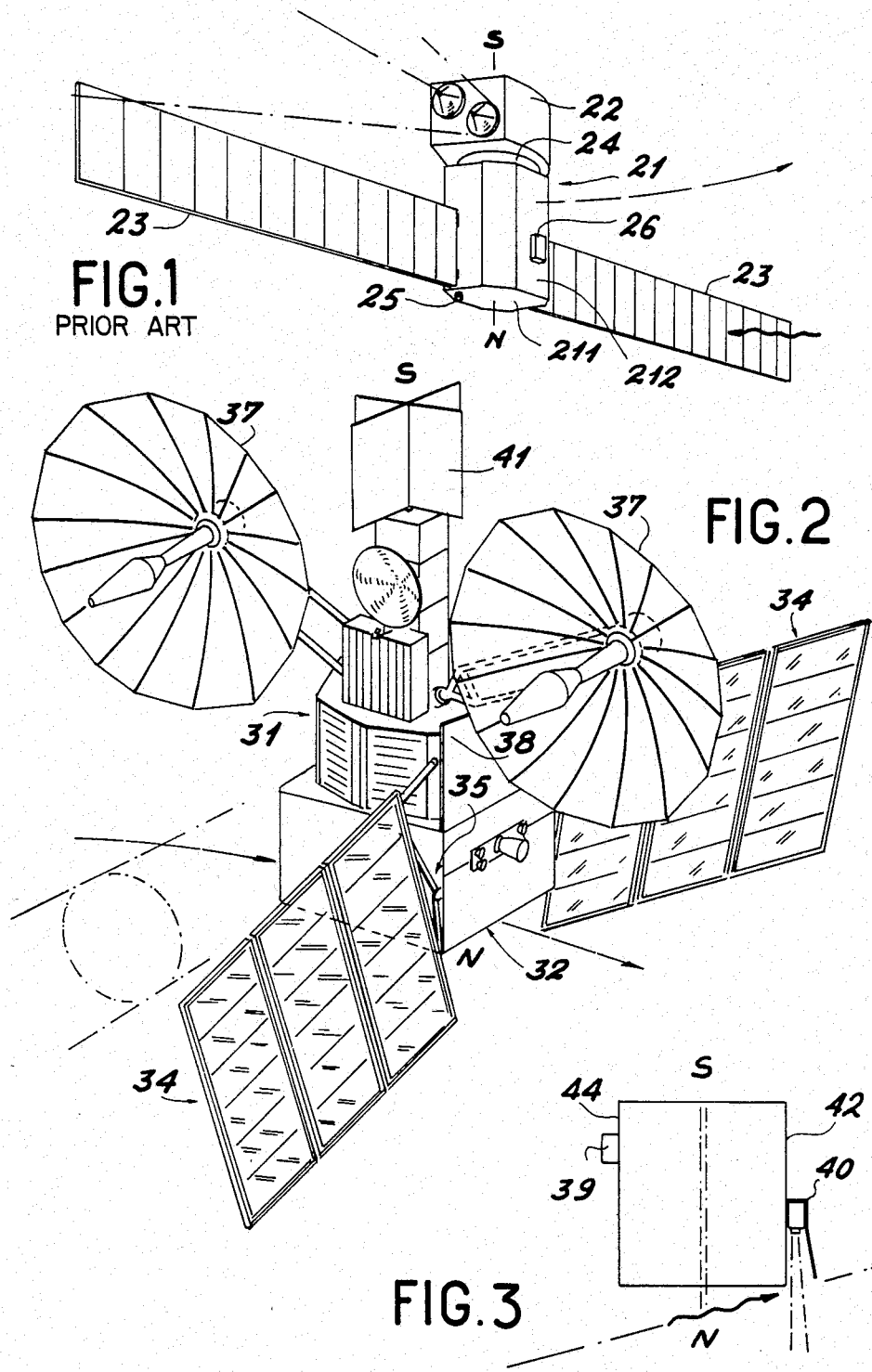
FIG. 2 a satellite according to the invention.
FIG. 3 a detail showing the location of the stellar sensor on the antisolar face.

The satellite shown in FIG. 2 comprises two parts rotating in relative manner about the North-South axis, a payload part 31 pointed towards the earth or any other reference, and a platform part 32 oriented towards the "mean" sun, i.e. towards the projection of the sun in the equatorial plane.

The platform part essentially comprises means making it possible to generate power, as well as control the attitude and orbit. This part also comprises a contrarotating system 33 between the payload and the platform and permitting the transfer of electrical power and various signals from the means ensuring the thermal control linked with the platform, a sunshield 38 for protecting the payload against solar radiation and various means used in management and calculation.

The part pointing towards the projection of the sun on the equatorial plane can comprise, in certain interesting cases, most of the payload. For example, only one or more reflectors 37 of the payload need be oriented towards the earth, whereas the emission part is located on the part pointed towards the sun.

The payload part in the launch configuration is connected to the platform by a discrete number of points (typically 4), through which pass the stresses on launch in such a way as to relieve the contrarotating system.

As the platform is maintained in the direction of the mean sun, the solar generator can be fixed. It is in the form of two planar fins or blades 34 connected to the platform by a device 35 enabling the generator to be brought into the correct position, e.g. during an opening out thereof. This device can be regulatable on the ground or in flight. The median line of each solar generator blade is inclined to the equatorial plane in such a way as, inter alia, to free the field of vision of the antennas and make acceptable the disturbing torques linked with the assembly formed by the solar generator and the antennas. The normal to the solar generator can be set in the mean sun direction or can follow the seasonal movement of the sun (±23°) or can be set in an optimum direction.

The attitude measurement system comprises a polar stellar sensor 40 (or two of these if a redundancy is sought) positioned on the antisolar phase 42 of the platform (cf. FIG. 3) and oriented towards the North. This sensor makes it possible to measure the two rotations about two axes perpendicular to the axis of rotation of the payload/ platform. The system may also comprise one (or optionally two) solar sensors 39 located on the solar face 44 of platform 32 and oriented towards the projection of the sun on the equatorial plane. This sensor 39 makes it possible to measure the attitude of the platform about the pitch axis, which is the North-South axis.

The pointing of the payload towards the earth is ensured either by one or more radio sensors, or by one or more earth sensors able to measure the rotations about the pitch axis with respect to the earth.

The arrangement described hereinbefore permits the use of an original actuation system, which will now be described. The actuation system according to the invention comprises a kinetic wheel, whose rotation axis is perpendicular to the North-South axis, and a reaction wheel.

A kinetic wheel or a reaction wheel makes it possible on a satellite to obtain a moment of reaction about its own rotation axis by the acceleration or deceleration of the rotor of the wheel. A reaction wheel comprises a rotor, whose angular velocity is between two opposite values, $(-\omega, +\omega)$. In the case of kinetic wheel, the angular velocity range of the rotor is between two high values of the same sign. If an external torque acts on the satellite, in order to maintain its orientation, it is necessary to accelerate the wheel in such a way as to create a moment of reaction opposed to the external disturbing torque. It is pointed out that the acceleration of the wheel takes place in the same direction as the disturbing torque acting on the satellite.

The external torques acting on the satellite generally have non-zero mean values. The wheel forms an "integrator" of these disturbing torques, because its rotation speed will increase or decrease as a function of the sign of the external torque.

As the operating range of a wheel is limited with respect to its angular velocity, it will be necessary to bring this velocity within the said range, when the velocity reaches the limit value and the latter operation constitutes the "desaturation" of the wheel.

In practice, this operation can be carried out by using the propulsion system necessary for the satellite orbit control and for certain attitude manoeuvres (attitude acquisition). In general the following procedure is adopted. A torque is produced with the aid of the propulsion system, whose duration and sign are such that the control system using the wheel (and the appropriate attitude measurement) will counter the disturbing torque. The rotation speed of the wheel is then brought to a value well within its operation range.

The invention proposes two general wheel arrangements, both of which use a kinetic wheel and a reaction wheel.

Figure 4:
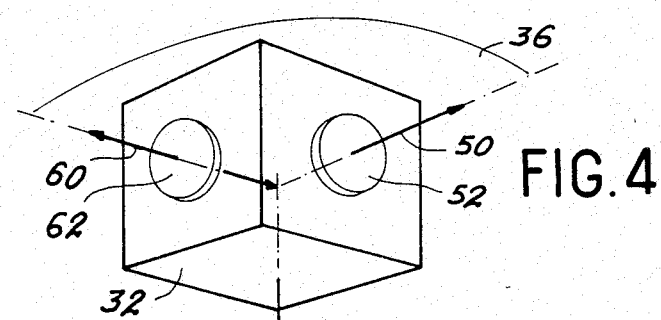
FIG. 4 diagrammatically a first variant of the actuation system according to the invention.

According to the first variant, illustrated in FIG. 4, the rotation axis 50 of kinetic wheel 52 is located in the equatorial plane 36 of the service module (or platform) 32 and the rotation axis 60 of the reaction wheel 62 is perpendicular to that of the kinetic wheel and is located in the same equatorial plane 36.

Figure 5:
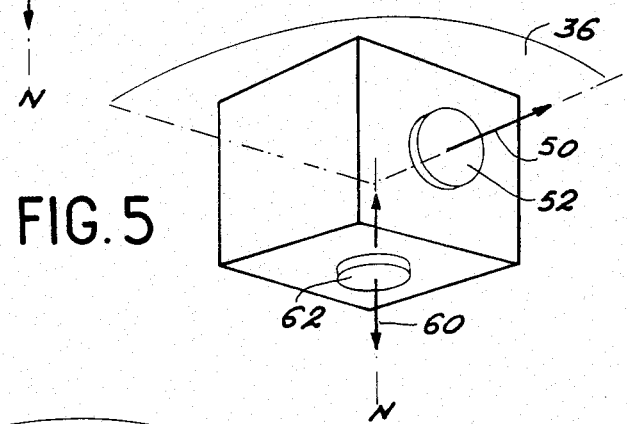
FIG. 5 diagrammatically a second variant of the actuation system according to the invention.

According to a second variant illustrated in FIG. 5, the rotation axis 50 of the kinetic wheel 52 is still in the equatorial plane 36 and the rotation axis 60 of reaction wheel 62 is oriented along the North-South axis.

For both these varients, the optimum orientation of the kinetic wheel corresponds to the direction of the "mean sun" intersection of the solar meridian and the equatorial plane).

For both these variants, the desaturation is carried out during the orbital corrections in the hereinafter described manner.

Figure 6:
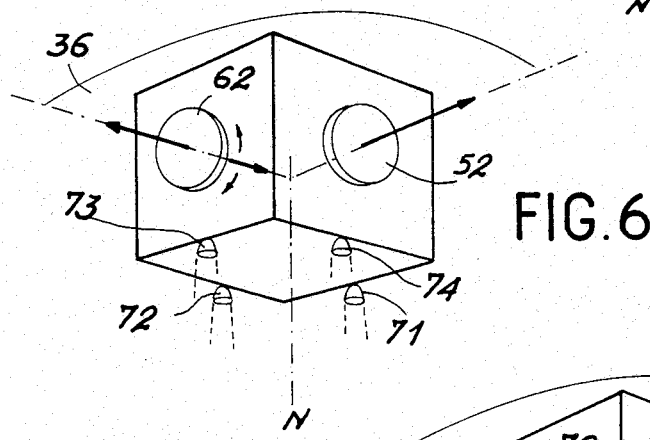
FIG. 6 the desaturation operation in the case of the first variant.

In the case of the first variant the desaturaton of the two wheels takes place by using a set of at least three nozzles oriented along the North-South axis and able to produce torques along the axes of each wheel, said same nozzles then carrying out the so-called orbit control or orbit slope control. FIG. 6 shows an example of desaturation using four nozzles 71, 72, 73, 74 during the North-South control.

Figure 7:
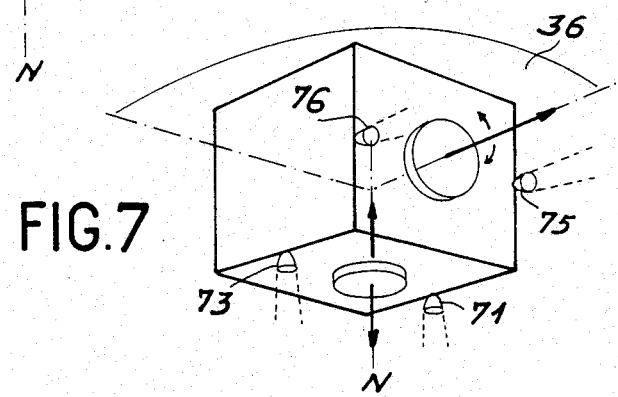
FIG. 7 the desaturation operation in the case of the second variant.

In the case of the second variant, the desaturation of the kinetic wheel takes place by means of at least two North-South nozzles 71, 73 able to produce a torque about the axis of the same wheel during the North-South orbit controls. The desaturation of the reaction wheel takes place during eccentricity controls or semi-major axis controls of the orbit by nozzles 75, 76 in the direction of the equatorial plane. FIG. 7 illustrates this desaturation mode.

In order to maintain a satellite on its nominal orbit, it is necessary for most telecommunications missions, to periodically carry out orbital corrections (slope, semi-major axis and eccentricity). The advantage of the system according to the invention is that the desaturation of the wheels does not lead to any fuel consumption, because this is included in the consumption necessary for orbit corrections.

Thus, the three axes control principle for the platform is as follows. In non-eclipse periods the attitude control about axes perpendicular to the North-South axis is ensured by the acceleration and deceleration of the kinetic wheel and the reaction wheel. The desaturation of these two wheels takes plce in the vicinity of a node of the orbit during North-South corrections and mainly by using nozzles providing the orbit control momentum in the North-South axis. As a result, the fuel consumption necessary for the desaturation of the wheels is zero or negligible, because it is integrally involved in the North-South control. In eclipse periods, the solar sensor no longer supplies information on the attitude measurements about the pitch axis (or North-South axis). The gyroscopic rigidity of the kinetic wheel is then used to maintain the attitude about this axis. It should be noted that the platform pointing performance about the pitch axis deteriorates only slightly during this period, because the disturbing torques which largely have a solar origin are then negligible.

In order to reduce solar disturbing torques, it may be advantageous to consider a variable slope of the solar generators relative to the orbital plane. This can in fact make it possible to counter most variable solar torques (on a daily or seasonal basis, and on a long-term basis) induced by antennas about payload 37.

The attitude control requirements of the platform about the pitch axis are less severe than along the other axes (requirements for the orientation of the solar generators, the payload being dependently controlled). As a result there are two alternatives. It is firstly possible to obviate the use of the reaction wheel without any supplementary fuel consumption by using solely the kinetic wheel disposed in the manner described hereinbefore. In this case, the depointing of the kinetic moment and consequently the platform about the pitch axis will directly replace the function of the reaction wheel. However, it is also possible for improving the performance of the platform about the axis parallel to the solar face and passing via the orbital plane, to place the reaction wheel in the pitch axis (or North-South axis).

Making the payload axis dependent on the earth is carried out directly by an axis sensor 1 (rotation measurement about the pitch axis) of the radio type or by an earth infrared sensor and by the position control of the contrarotating system of the payload with respect to the platform. This sensor is located on the payload.

The advantages resulting from these arrangements are described below:
 (1) Satellite pointing accuracy greatly superior to that of existing telecommunications satellites and particularly around the yaw axis ($\sim 1/100$ of degree).
 (2) Greater efficiency of the propulsion system and particularly for orbital corrections along the North-South axis.
 (3) Possibility of random depointing of the payload about the pitch axis relative to the earth with the same roll-yaw depointing performances.
 (4) Possibility of introducing a roll-yaw bias of at least $\pm 5°$ on the attitude of the satellite, whilst retaining the pointing accuracy performance along these two axes.

Other advantages can be added to this list. Thus, in the proposed configuration, one face of satellite 44 is constantly exposed to the solar flux. If correctly insulated, it causes no thermal problem. However, the other faces of the satellite are never illuminated by the sun. Thus, there is virtually no daily or seasonal cycle of the temperature of the equipment. In addition, there is no longer any significant ageing to the coatings. Thus, this solution offers the following advantages:
 reduction of daily and seasonal temperature variations of the equipment, leading to a reduction of thermal stresses, the possibility of reducing the average operating temperature of the equipment, increase in the overall reliability of the equipment and simplification of the thermal control;
 possibility of increasing the life of the satellite, because it no longer has any influence on the thermal problems thereof;
 simplification of the ground thermal acceptance tests and consequently a reduction of the cost, because they no longer require a rotation system in a simulation chamber or a solar simulator, which is expensive and difficult to develop and costly to use;
 simplifications in the cleanness precautions during ground operations, because the coatings are insensitive to pollution and ageing problems.

What is claimed is:

1. An equatorial orbit satellite comprising a platform having two axes located in the orbital plane of the satellite and an axis perpendicular to said plane, said platform having an antisolar face; a payload; means fixed to the platform for orienting the platform axis perpendicular to the orbital plane in the North-South direction; a solar sensor also fixed to the platform and directed towards the sun; two solar panels formed by two blades symmetrically connected to the platform, said blades each having a medium line inclined by a certain angle relative to the equatorial plane; actuation means located in the platform; communication antennas integral with the payload; and means fixed to the payload for orienting one axis of the payload in the direction of the earth.

2. A satellite according to claim 1, comprising a sunshield fixed to the platform and casting shadow onto the payload.

* * * * *